United States Patent
Loats et al.

[11] Patent Number: 5,893,063
[45] Date of Patent: Apr. 6, 1999

[54] DATA PROCESSING SYSTEM AND METHOD FOR DYNAMICALLY ACCESSING AN APPLICATION USING A VOICE COMMAND

[75] Inventors: Philip Albert Loats; William Joseph Tracey, II; Xiaotong Wang, all of Round Rock, Tex.

[73] Assignee: International Business Machines Corporation, Armonk, N.Y.

[21] Appl. No.: 812,890

[22] Filed: Mar. 10, 1997

[51] Int. Cl.[6] .................................................. G10L 3/00
[52] U.S. Cl. ........................................ 704/275; 704/270
[58] Field of Search .................................. 704/275, 270

[56] References Cited

U.S. PATENT DOCUMENTS

| | | |
|---|---|---|
| 4,829,423 | 5/1989 | Tennant et al. . |
| 4,931,950 | 6/1990 | Isle et al. . |
| 5,208,745 | 5/1993 | Quentin et al. . |
| 5,305,244 | 4/1994 | Newman et al. . |
| 5,377,303 | 12/1994 | Firman ................................. 704/275 |
| 5,537,618 | 7/1996 | Boulton et al. . |
| 5,566,291 | 10/1996 | Boulton et al. . |

*Primary Examiner*—David R. Hudspeth
*Assistant Examiner*—Robert Louis Sax
*Attorney, Agent, or Firm*—Barry S. Newberger; Winstead Sechrest & Minick P.C.; Anthony V. S. England

[57] ABSTRACT

A voice command interface is implemented in a data processing system whereby a user may select any application which is currently running on the data processing system without having to manually modify a list of programs which may be accessed by a voice command and without having to request the program by its full name. To allow a user to access a program which is currently running on the data processing system, control within the data processing system ensures that a name of the program or application which is opened by an external user is added to a window list automatically. Similarly, a program which is no longer enabled by a user and running on the data processing system will be automatically removed from the window list. Additionally, the data processing system and methodology implemented therein allow an external user to speak merely a portion of a title of an application to access the application using a voice command. When two or more programs have the same or similar titles, the data processing system first accesses a program which is first on the window list. If this is not the program desired by the user, the user then repeats the command and a next program or application is accessed and brought into focus. This procedure repeats and may even loop back to the first access program if the user continues to repeat commands accessing the program having similar or the same titles.

29 Claims, 9 Drawing Sheets

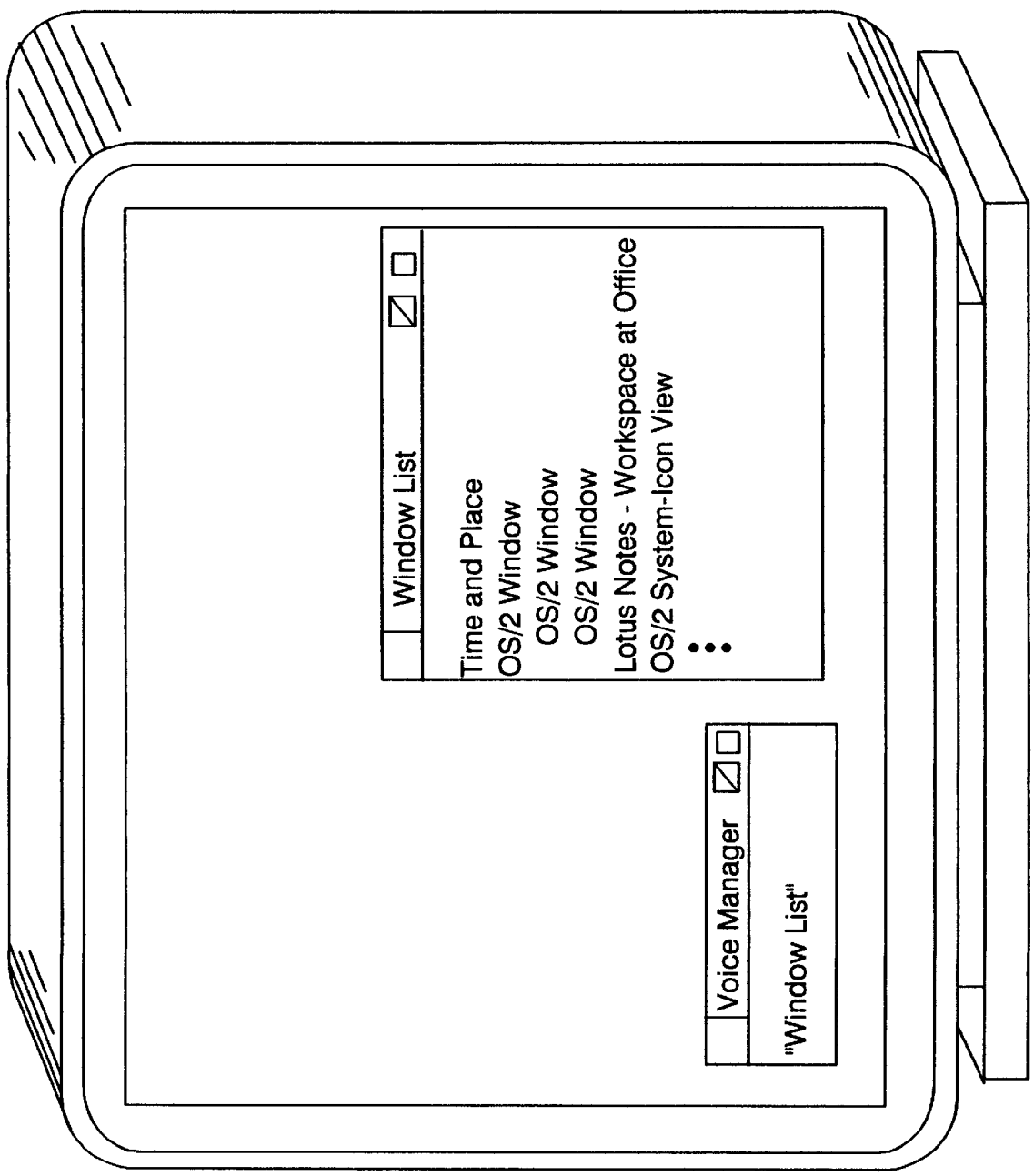

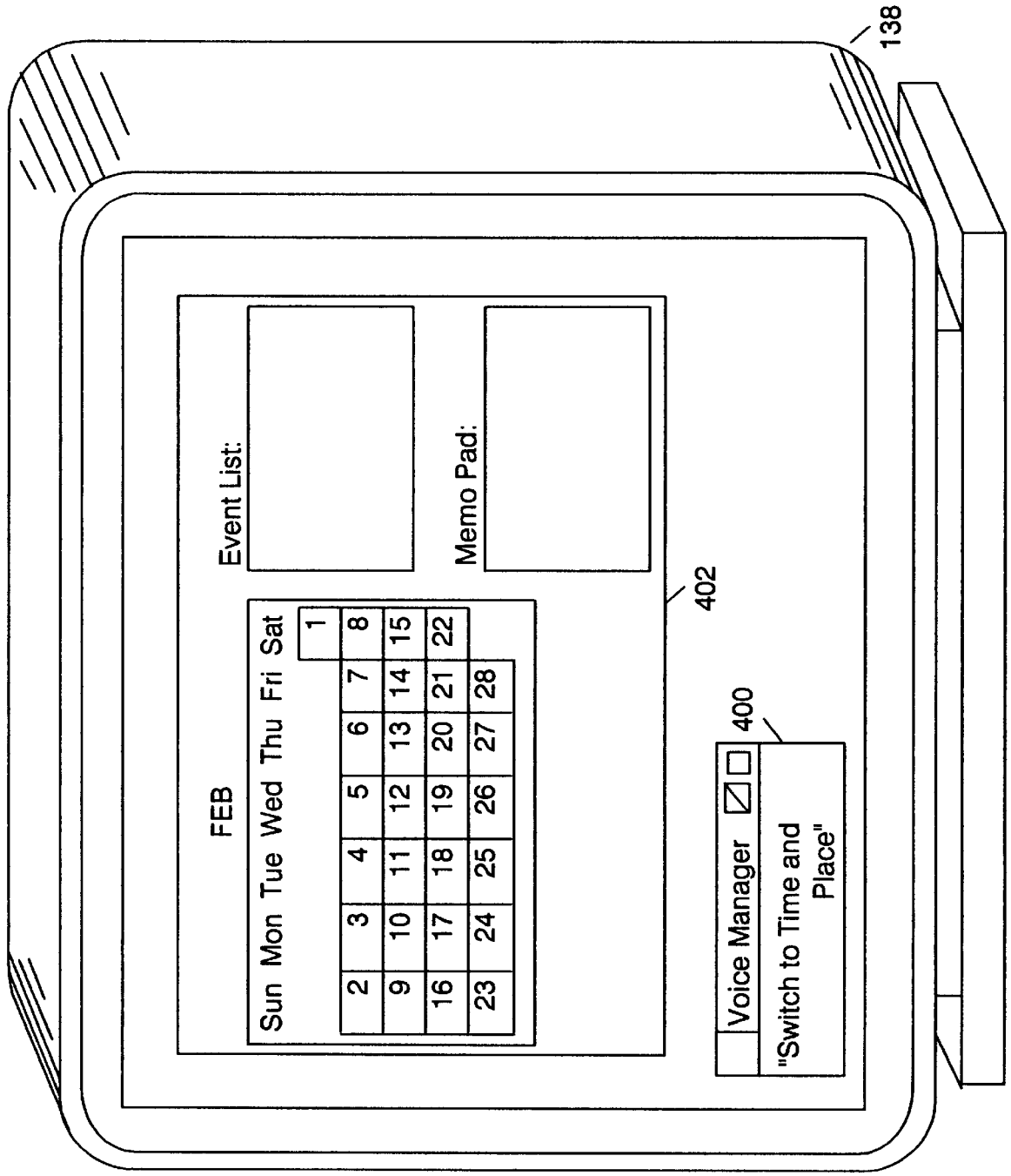

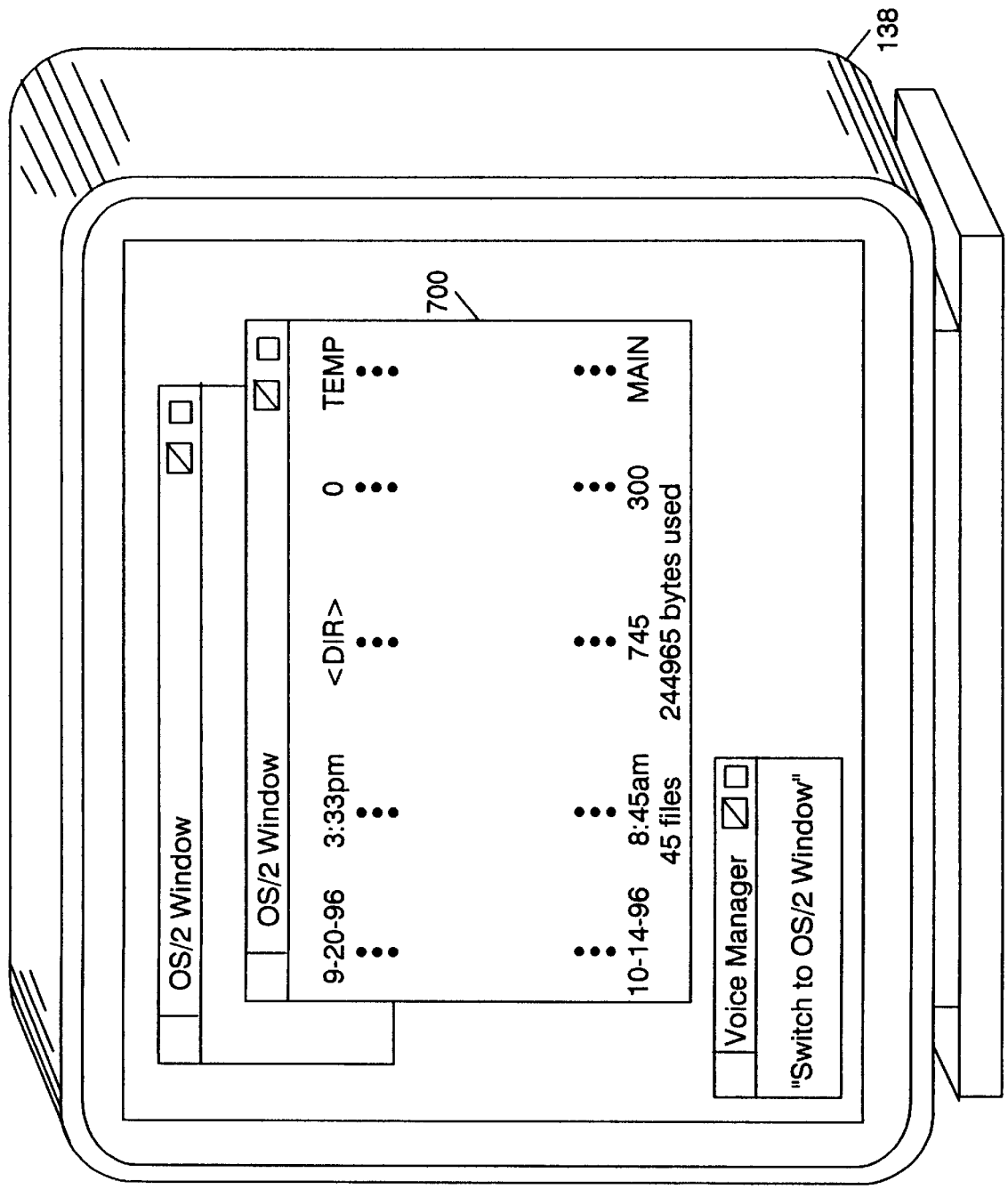

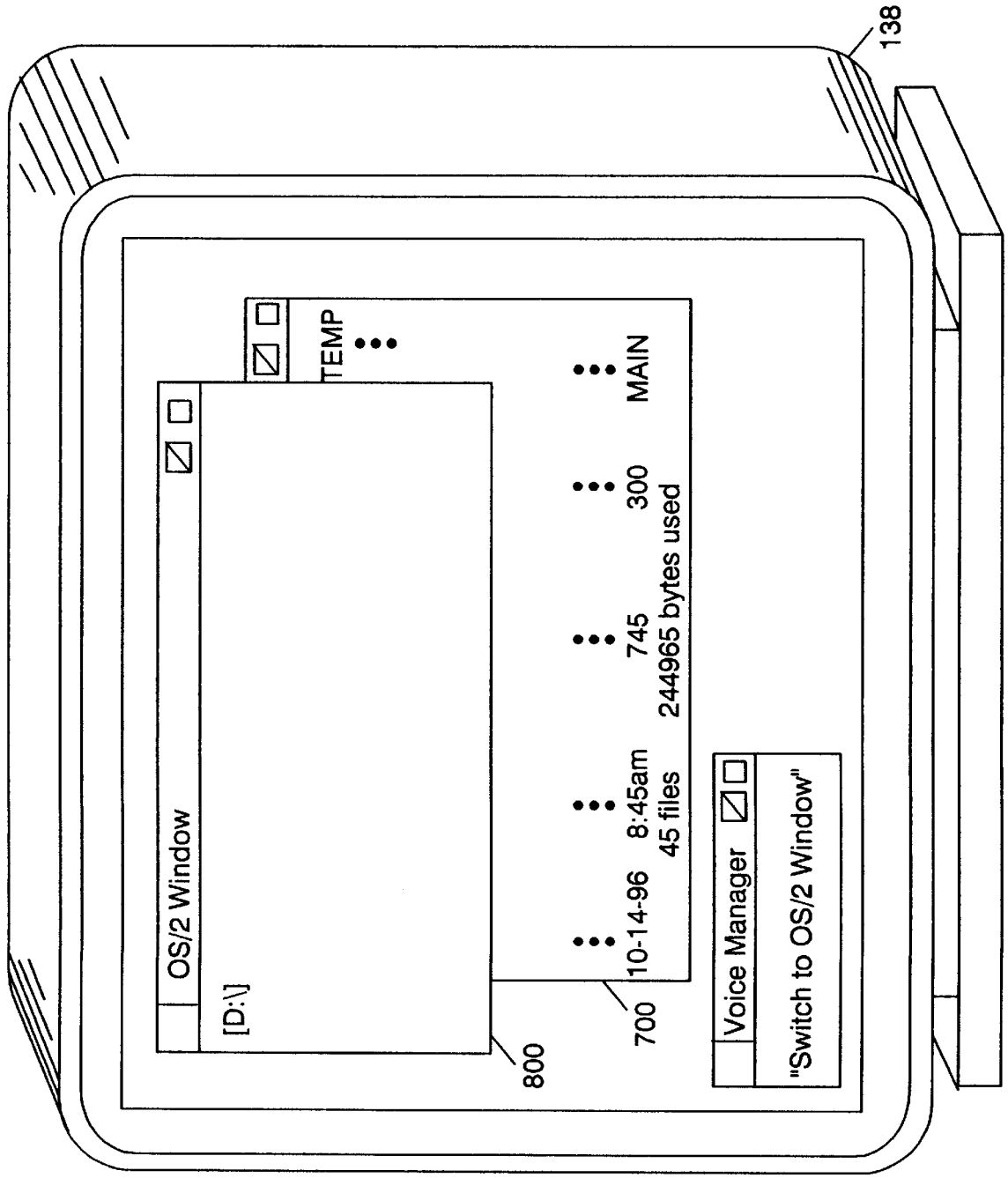

DATA PROCESSING SYSTEM AND METHOD FOR DYNAMICALLY ACCESSING AN APPLICATION USING A VOICE COMMAND

CROSS-REFERENCE TO RELATED APPLICATION

The present patent application is related to the following, co-pending patent application:

Ser. No. 08/812,888 entitled "DATA PROCESSING SYSTEM AND METHOD FOR SWITCHING BETWEEN PROGRAMS HAVING A SAME TITLE USING A VOICE COMMAND" (Attorney Docket No. AT9-97-036), which has been assigned to the assignee of the present application and is being filed concurrently herewith.

TECHNICAL FIELD

The present invention relates in general to a data processing system interface with an external user, and in particular, to an interface system which uses voice commands provided by an external user to selectively access applications on the data processing system.

BACKGROUND INFORMATION

With the ever increasing use of computers by people of all walks of life, developers of computer systems have had to design computer interfaces which interact with the user in an intuitive and effective manner. In an attempt to effectively communicate with all types of external users, designers of many computer systems have implemented user interfaces which respond to voice commands. For examples of such interfaces, refer to IBM Voice Type Dictation 1.1 for OS/2 and IBM Voice Type Dictation 3.0 for Windows '95.

As is known in the data processing art, a speech recognition apparatus required to implement such user interfaces which respond to voice commands. Speech recognition apparatuses generally include an acoustic processor and stores a set of acoustic models. The acoustic processor measures sound features of an utterance by an external user and the acoustic model represents the acoustic features of the utterance of one or more words associated with the model. The sound features of the utterance are then compared to each acoustic model to produce a match score. The match score for an utterance and an acoustic model is an estimate of the closeness of the sound features of the actual utterance to the acoustic model.

The word or words associated with the acoustic model having the best match score may then be selected as the recognition results. Alternatively, the acoustic match score may be combined with other match scores, such as additional acoustic match scores and language model match scores. The word or words associated with the acoustic model or models having the best combined match score may then be selected as the recognition result.

For command and control applications, the speech recognition apparatus typically implemented recognizes an uttered command. Subsequently, the computer system executes a command to perform a function associated with the recognized command. For this purpose, the command associated with the acoustic model having the best match score is selected as the recognition result. Problems associated with inadvertent sounds such as coughs, size, or spoken words not intended for recognition have been alleviated by the invention disclosed within U.S. Pat. No. 5,465,317, which is hereby incorporated by reference herein.

As problems associated with recognizing spoken commands in a computer system have been reduced, or even alleviated, computer systems have taken advantage of this new and easily implemented interface to perform certain functions within the computer system. For example, International Business Machines Corporation has developed a VoiceType® V product which effectively allows a user to speak commands and have a computer system respond in a limited manner. Specifically, a user may specify a program or application to be accessed using voice commands. A speech recognition unit, such as those previously described, is then used to detect when an external user utters the specified phrases. Upon determining that an uttered word corresponds to the list specified by a user, the computer system implementing this interface accesses a program in response to a user's utterance of a word which is specified on the previously programmed static window list described above. Thus, such systems effectively implement a user interface in which program control may be specified by a voice command when the program has previously been stored in a specified list by the user.

While the aforementioned voice command interface works well, a user is limited by a manner in which voice commands may be issued. For example, because the program list is programmed and static, the user is only able to access the programs designated therein by a voice command. Therefore, the user is limited in the programs which are accessible by a voice command and is only able to access a program previously stored in the program list. To access additional programs using a voice command, a user is required to update a list of programs which are accessible by a voice command.

Furthermore, current implementations of voice command interfaces for computer systems require an external user to speak a full title precisely and accurately to access a computer application corresponding to that title. In situations in which different views of an application are provided or different components of the application are to be accessed, a user may encounter difficulty as the voice command interface becomes less intuitive and, therefore, a less effective interface for the user. For example, when a user desires to view a desktop, a user must specify whether it is Desktop-Icon View, Desktop Tree View, or Desktop-Properties, among others. In this situation, a user is required to speak the full title to access an application using voice command. Therefore, if a user simply spoke "a desktop," the speech recognition unit corresponding to the computer system would not find a match because the full label had not been spoken. In this case, a user is limited by a computer systems requirements that stilted, lengthy language be input to be recognized by the voice command interface.

Therefore, a need exists for a voice command interface which allows a user to communicate in a more natural and intuitive manner to perform desired actions on a data processing system.

SUMMARY OF THE INVENTION

The previously mentioned needs are fulfilled with the present invention. Accordingly, there is provided, in a first form, a data processing system. The data processing system includes a memory for storing a window list and a first input circuit for receiving a first user input. A central processing unit is coupled to the first input circuit for receiving the first user input. The central processing unit accesses a first program having a first characteristic and performs a first operation in response to the first user input. The central processing unit selectively modifies the window list to form a modified window list in response to the first operation. A speech recognition unit is connected to the memory to access the modified window list. The speech recognition unit is capable of recognizing a voice command corresponding to a first item of the modified window list.

Additionally, there is provided, in a second form, a method for accessing a data processing system. The method includes the steps of storing a window list in the memory, receiving a first user input at a first user interface, and accessing a first program in response to the first user input. A central processing unit is enabled to perform a first operation in response to the first user input. The central processing unit is also enabled to selectively modify the window list to form a modified window list in response to the first operation. The method performs the steps of parsing the modified window list to determine a first speakable object and enabling a speech recognition unit to recognize the first speakable object.

There is also provided, in a third form, a program storage device readable by a machine, tangibly embodying a program of instructions executable by the machine to perform method steps for accessing a data processing system. The method steps include receiving a first user input at a first user interface, accessing a first program in response to the first user interface, and enabling a central processing unit to perform a first operation in response to the first user input. The method steps also include the steps of enabling the central processing unit to selectively modify the window list to perform a modified window list in response to the first operation, parsing the modified window list to determine a first speakable object, and enabling a speech recognition unit to recognize the first speakable object.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3-B illustrates, in flow diagram form, a portion of the methodology of FIG. 3-A;

FIG. 4 illustrates, in block diagram form, a display device in accordance with one embodiment of the present invention;

FIG. 5 illustrates, in block diagram form, a display device in accordance with one embodiment of the present invention;

FIG. 7 illustrates, in block diagram form, a display device in accordance with one embodiment of the present invention; and FIG. 8 illustrates, in block diagram form, a display device in accordance with one embodiment of the present invention.

DETAILED DESCRIPTION

Figure 1:
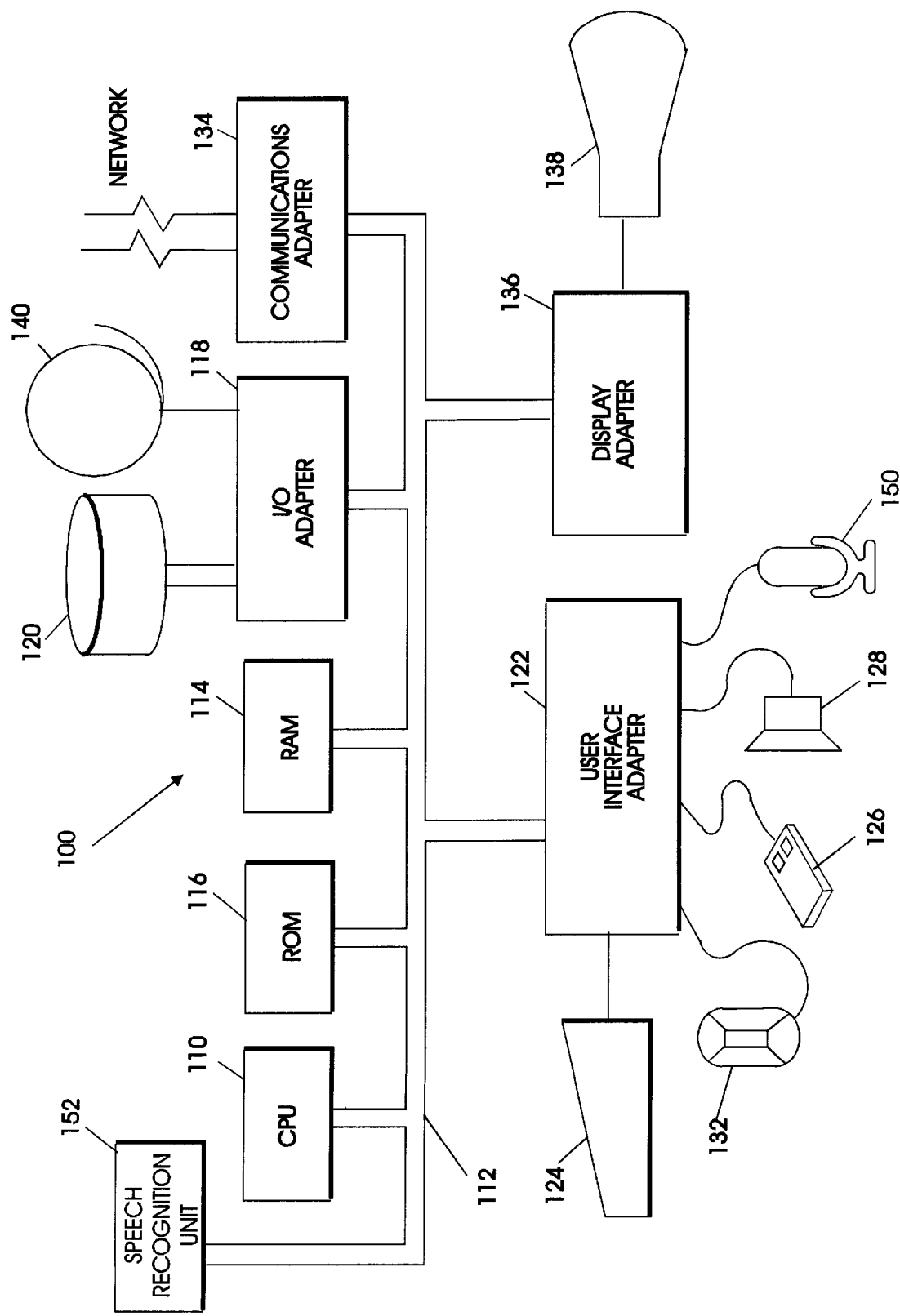
FIG. 1 illustrates, in block diagram form, a data processing system in accordance with one embodiment of the present invention.

The present invention implements a voice command interface whereby a user may select any application which is currently running on the data processing system without having to manually modify a list of programs which may be accessed by a voice command and without having to request the program by its fill name. The present invention implements these improvements using several techniques.

In a first technique, a window list which stores the names of programs that may be accessed via a voice command is dynamically updated at the time a program is accessed and enabled on the data processing system. Stated another way, when a program is accessed and enabled on the data processing system of the present invention, control within the data processing system ensures that a name of the program or application is added to the window list. This window list is subsequently used to determine the commands which a user may speak to access a desired application. As previously mentioned, prior art implementations require a user to manually update a program list with the programs that could be accessed using a voice command. In contrast, the present invention accesses a window list which is updated automatically upon opening or closing a program or application and the resulting window list is used to determine the program or application which is accessible by a voice command. Therefore, to use a voice command to access the program or application, the user must merely state the title or label associated with a desired running program to bring that program or application into focus on the data processing system.

Furthermore, to access a program utilizing the methodology described above, the present invention recognizes that some programs and applications will have the same or similar titles. In this instance, rather than requiring a user to speak the entire title, the present invention allows an external user to speak merely a portion of the title. When two or more programs have the same or similar titles, the present invention first accesses a first program which is first on the window a list. If this is not the program desired by the user, the user repeats the command and a next program or application is accessed and brought into focus. This procedure repeats and may even loop back to the first accessed program if the user continues to repeat commands accessing the programs having similar or the same titles. Operation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110. The CPU 110 is coupled to various other components by system bus 112. Speech recognition unit 152 is coupled to various other components of data processing system 100 by system bus 112. Additionally, it should be noted that speech recognition unit 152 may be implemented as software which resides in RAM 114, ROM 116, disk storage device 120, or storage device 140. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128, and microphone 150 are all interconnected to bus 112 via user interface adapter 122. Display monitor 138 is connected to system bus 112 by display adapter 136. In this manner, a user is capable of inputting to the system through keyboard 124, trackball 132, mouse 126, and microphone 150 and receiving output from the system via speakers 128 and display device 138. Additionally, an operating system is used to coordinate the functions of the various components shown in FIG. 1. It should be noted that the operating system may be OS/2 ("OS/2" is a trademark of the IBM Corporation). During operation of the present invention, the operating system and a voice navigator may be stored in RAM 114, ROM 116, disk storage device 129 or storage device 140. Furthermore, it should be noted that the voice navigator is an application which controls speech communications between an external user and data processing system 100.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory such as disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

During a following description of operation, speech recognition unit 152 will be referred to often. A more detailed description of speech recognition unit 152 will not be provided herein as such units are well-known in the relevant data processing art. For information regarding speech recognition unit 152, refer to U.S. Pat. No. 5,465,317, entitled "Speech Recognition System With Improved Rejection of Words and Sounds Not in the System Vocabulary," by Edward A. Epstein, et al., and issued on Nov. 7, 1995, which is hereby incorporated by reference herein. For additional information, refer to U.S. Pat. No. 5,513,298 entitled "Instantaneous Context Switching for Speech Recognition Systems" by Vince M. Stanford, et al., and issued on Apr. 30, 1996.

Figure 2:
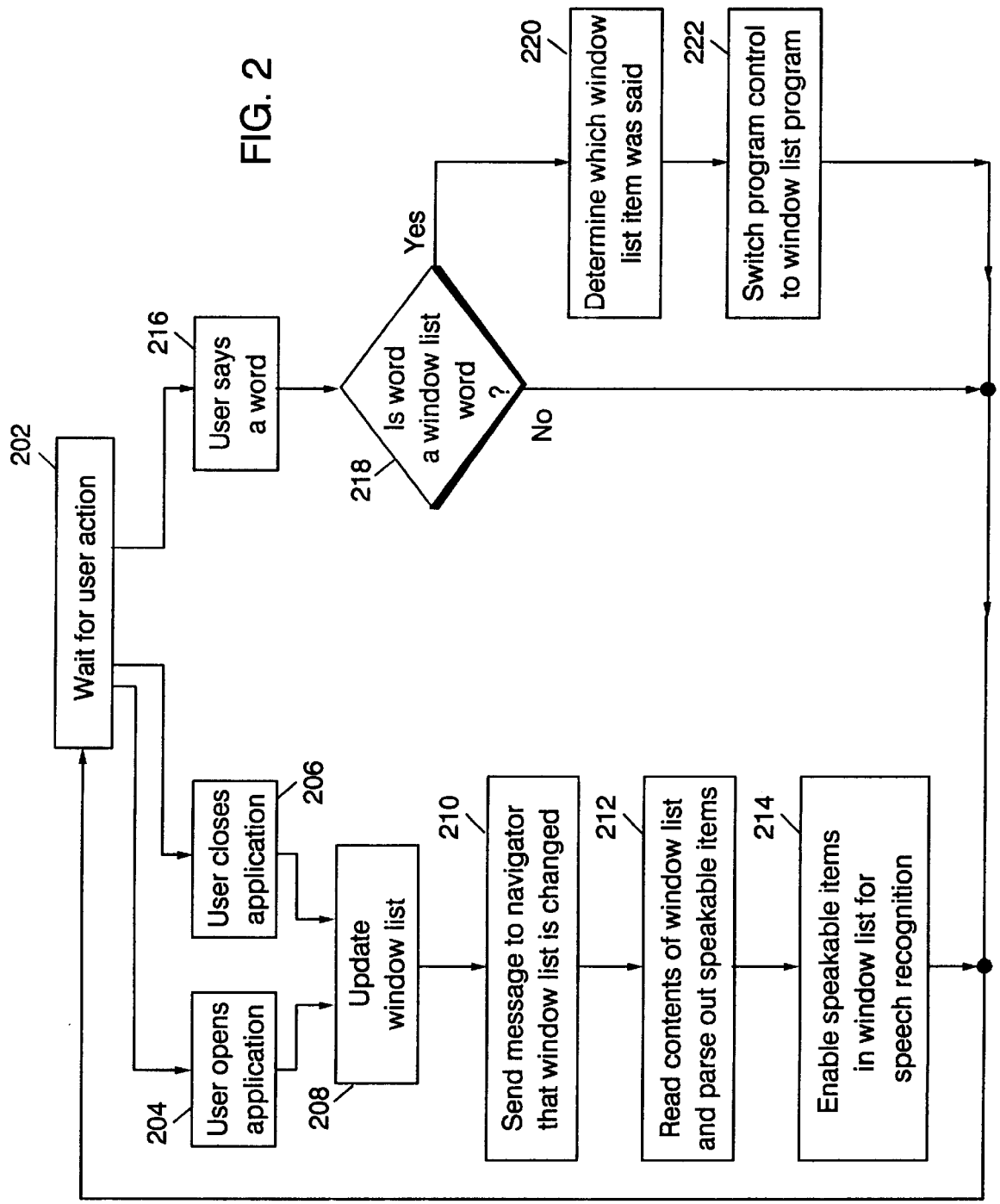
FIG. 2 illustrates, in flow diagram form, a methodology for responding to a voice command in accordance with one embodiment of the present invention.

The use of data processing system 100 to execute the operations of the present invention will subsequently be described with reference to FIG. 2. Assume that in a first stage of operation data processing system 100 is operating using an operating system such as OS/2 available from IBM Corporation or Windows '95 available from Microsoft. It should also be noted that additional operating systems could also be used to implement the present invention. As illustrated in FIG. 2, a first step requires data processing system to wait for a user action. CPU 110 executes step 202 by polling inputs received from user interface adapter 122 and communications adapter 134 to determine whether an external user has performed an action which requires data processing system 100 to perform a specified function. For example, in a step 204, CPU 110 detects when a user opens an application. As is well-known in the data processing art, a user may open an application by clicking a button on mouse 126, positioning and enabling trackball 132, or pressing a key on keyboard 124. Additionally, CPU 110 uses each of the input devices previously described to determine when a user closes an application in a step 206. The steps executed by a user and data processing system 100 to open and close applications are well-known to those with skill in the relevant data processing art and will not be described in detail herein.

After a user has opened or closed an application, a window list stored in memory, such as RAM 114, is updated with the modified information in a step 208. As the window list comprises a list of all applications which are currently enabled or running, window list 208 is updated each time a user opens an application or closes an application. The window list is updated using well-known techniques which are implemented in most major operating systems. Such an update may be performed by adding appropriate information to a window list display when the operating system launches an application. Methodologies for updating the window list when an application is launched are well-known to those with skill in the art and will not be described in detail herein. The window list is updated in response to control signals provided by CPU 110 upon receipt of information which indicates that an application has been opened or closed from user interface adapter 122 or communications adapter 134.

Subsequently, CPU 110 provides control signals as a message to a navigator program. It should be noted that a navigator program could be stored in RAM 114, ROM 116, disk storage device 120 or storage device 140 of data processing system 100. The navigator program is an application which controls speech communications between an external user and a data processing system 100. The navigator program controls operation of speech recognition unit 152 so that a user's command is detected and an action is performed in response thereto, when applicable. The navigator program, upon receipt of the message that the window list was modified in step 210, enables speech recognition unit 152 to access the contents of the window list from RAM 114 in a step 212. After accessing the contents of the window list, speech recognition unit 152 parses out speakable items using well-known parsing techniques. To summarize these parsing techniques, voice commands which are separated by a "-" or a ":" are available for users to select a corresponding program to access. Furthermore, if a file name appears in a task list, voice commands stating the file name without a corresponding extension will access the task list.

After speakable items have been parsed from the contents of the window list, speech recognition unit 152 enables speakable items in the window list to participate in a subsequent speech recognition operation during a subsequent voice command operation. It should be noted that the speakable items which are enabled correspond to words already known and recognized by speech recognition unit 152. However, in the absence of an open and running application, such speakable items are not enabled for recognition during a subsequent voice command operation.

When data processing system 100 is waiting for a user action in a manner previously described and an external user utters a word, the word is transferred from microphone 150 to user interface adapter 122. Under control from CPU 110, the word is passed from user interface adapter 122 to speech recognition unit 152. Speech recognition unit 152 subsequently determines whether the word is a window list word in a step 218. Speech recognition unit 152 subsequently performs this function by executing a comparison between a recognized word and a list of words enabled for the window list. Additionally, this operation may be performed by enabling speech recognition unit 152 to identify characteristics such as unique tags or grouping data which indicate a recognized word is enabled for the window list. If the word is not a window list word, speech recognition unit 152 indicates that the word is not included in its vocabulary and subsequently waits for a next user action. However, if the word is a window list words, speech recognition unit 152 subsequently determines which window list item was said by the user. Speech recognition unit 152 performs this function by comparing the spoken word, after being processed by speech recognition unit 152 to be in a digital form, with a matching table which stores each of the words recognized by speech recognition unit 152. It should be noted that the conversion of the word from the microphone to a digital form is well-known in the relevant data processing art and will not be described in detail herein.

After speech recognition unit 152 determines which window list item was spoken by the user in a step 220, the voice navigator system of data processing system 100 provides control information to indicate a window handle or identifier of the desired application corresponding to the word uttered by the user. The window handle or identifier identified by speech recognition unit 152 is subsequently provided to CPU 110. CPU 110 then provides the proper control signals to change a focus of the desired program to a first-order focus of data processing system 100. When the desired program is in the first-order field of focus, an external user is able to access a desired program.

Because the window list is automatically updated in step 208 when a user opens or closes an application, and the updated window list is automatically detected and recognized by speech recognition unit 152, the present invention allows a user to more quickly, efficiently, and intuitively access a running program on data processing system 100.

Figure 3A:
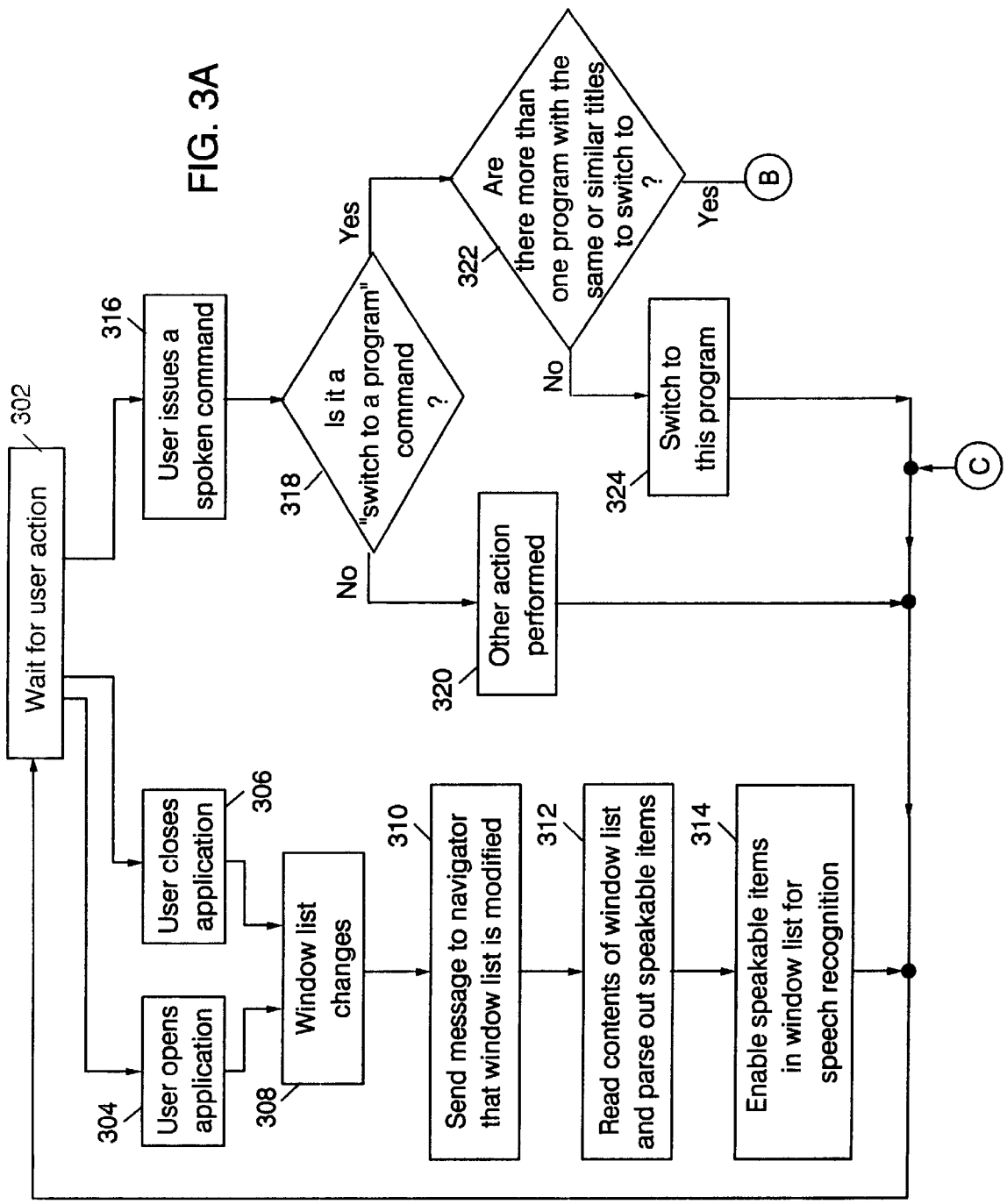
FIG. 3-A illustrates, in flow diagram form, a methodology for responding to a voice command in accordance with one embodiment of the present invention.
Figure 3B:
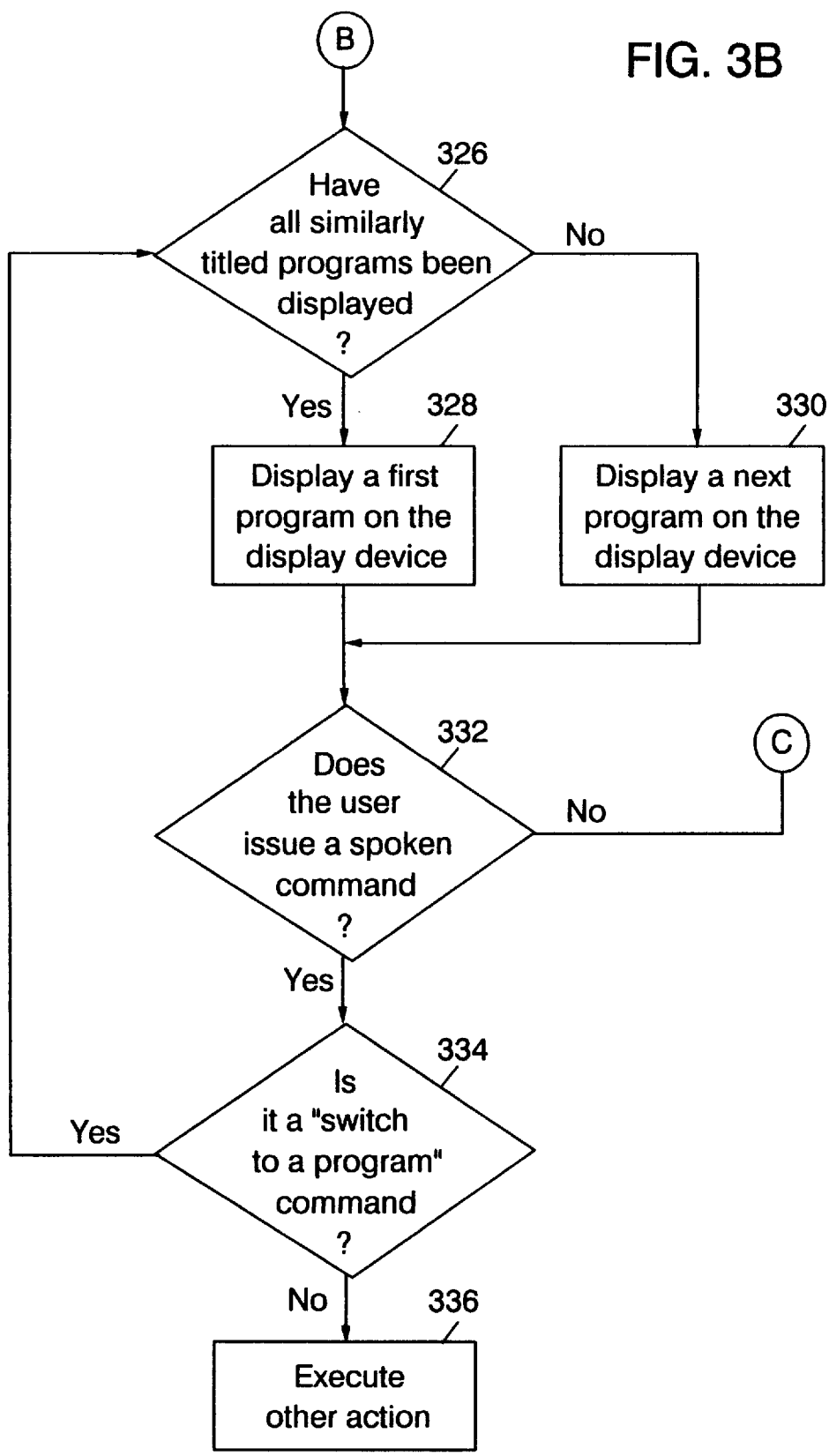
Figure 6:
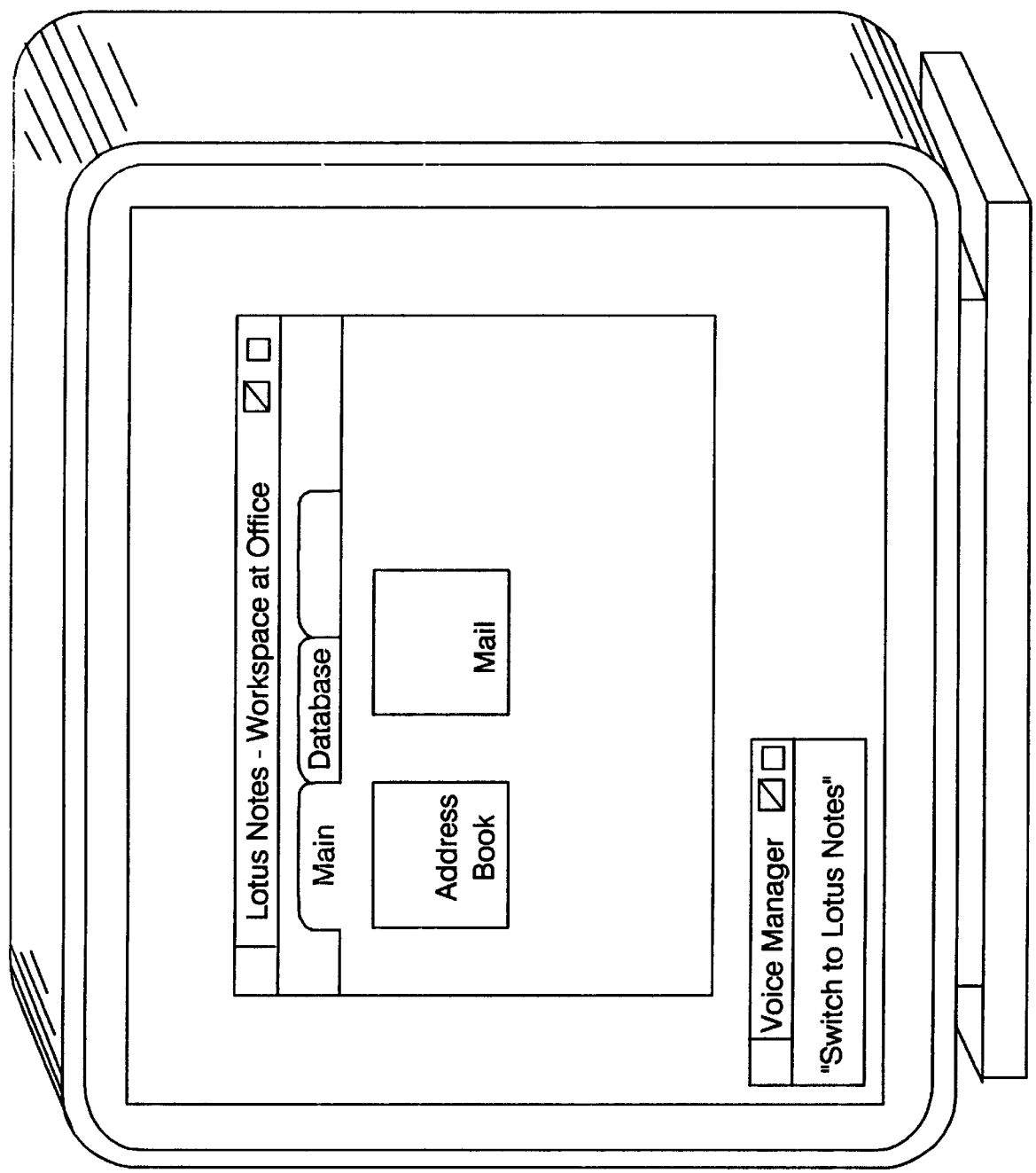
FIG. 6 illustrates, in block diagram form, a display device in accordance with one embodiment of the present invention.

Building upon the methodology described and illustrated in FIG. 2, FIGS. 3-A and 3-B provide an alternate embodiment of the present invention. In FIG. 3-A, each of steps 302–314 is executed in a similar manner to steps 202–214 in FIG. 2. However, an alternate methodology for executing the present invention is provided in a remaining portion of FIG. 3-A and FIG. 3-B. In step 316, a user issues a spoken command. Subsequently, in a step 318, speech recognition unit 152 determines whether a form of the command is "switched to a 'program'." If the spoken command issued by the user and detected by speech recognition unit 152 is not a command having the former "switch to a 'program'," another action is performed in a step 320. This other action is performed by CPU 110 under the control of a navigator of the operating system. Alternatively, the navigator could determine that the desired action is an invalid command and perform no operation.

However, if speech recognition unit 152 determines that the command spoken by the user into microphone 150 has a form of "switch to" followed by the name of a program, wherein the program is listed on the window list, a step 322 is executed. In a step 322, a navigator of the operating system determines whether there are more than program with the same or similar titles to the program requested to in the "switch to" command. If there is only one program with the same or similar title to that specified in the "switch command," CPU 110 switches a focus of data processing system 100 to the specified program in a step 324.

However, if there are more than one program with the same or similar titles identified in the "switch to" command, a step 326 of FIG. 3-B is executed. In step 326, CPU 110 determines whether all similarly titled programs have been displayed by tracking previous displays of the similarly titled programs. If all similarly titled programs have been displayed, a first program is displayed on display device 138 under control of CPU 110 and display adapter 136 (step 328). Thus, a first program is displayed on display device 138. Next, speech recognition unit 152 must determine whether a user has specified a spoken command to microphone 150 in a step 332. If the user has not issued a spoken command, a program flow returns to step 302 of FIG. 3-A.

However, if the user has spoken a command, it must again be determined whether or not the command has the form of a "switch to" command in a step 334. If the command is not a "switch to" command, an action specified by the user is executed in step 336 under control of CPU 110. However, if the command is a "switch to" command, CPU 110 will access the window list to determine whether all similarly titled programs have been previously displayed on display device 138. If not, CPU 110 provides the control signals to display a next program on display device 138 in a step 330. The next program is chosen by being a next title displayed on window list before the previous program was displayed on display device 138. If all similarly titled programs have previously been displayed, CPU 110 provides control signals to display the first program on display device 138. Subsequently, program, flow returns to step 332. It should be noted that all similarly titled programs will be consecutively displayed in a looping fashion until the user selects one or determines that no operation should be executed using this program. While operation of the present invention has been described utilizing the system diagram of FIG. 1 and the flow charts of FIGS. 2, 3-A and 3-B, an example of operation of the present invention will subsequently be provided.

During operation of the present invention, a user may speak a command into microphone 150. As previously described, this spoken command is provided to CPU 110 and speech recognition unit 152 via user interface adapter 122 and system bus 112. Assume in a first step of this operation that a user desires to view a window list for data processing system 100. As previously discussed, the window list represents all programs and applications which are currently enabled and running in one embodiment of the present invention. In accessing the window list, the user must speak the voice command "window list" into microphone 150. Microphone 150 transfers these utterances to speech recognition unit 152. Speech recognition unit 152 subsequently compares the utterances provided by user interface adapter 122 to determine that the term "window list" corresponds to a term which is "knows." Upon recognition of the term "window list" by speech recognition unit 152, speech recognition unit 152 provides the appropriate control and data information to display adapter 136. Display adapter 136 provides this information to display 138, wherein a Voice Manager window is configured to illustrate the terms spoken by the external user into microphone 150 are recognized as being a "window list" term by speech recognition unit 152. In response to the window list command, speech recognition unit 152 provides the appropriate data and control signals to CPU 110. CPU 110 subsequently accesses the window list from RAM 114 and provides the appropriate control and data signals to display adapter 136. Display adapter 136 subsequently configures the window list window on display device 138 which displays each of the applications corresponding to the window list stored in RAM 114. The previous steps performed operations reflected in FIG. 4 of the present invention.

FIG. 5 illustrates a next example of operation. In this example, display device 138 has a voice manager 400 and an application 402 displayed thereon. It should be noted that display device 138 and the objects illustrated thereon are determined by a remaining portion of data processing system 100. For example, CPU 110 controls the data communicated between display adapter 136 and both ROM 116 and RAM 114 to determine an object displayed on display device 138. In display device 138 of the present invention, a Voice Manager window 400 is provided. Voice Manager window 400 reflects a user's voice command as recognized by speech recognition unit 152. Therefore, as illustrated in FIG. 5, Voice Manager window 400 indicates that a user executed a "switch to Time and Place" command. As previously described, a user speaks this command to microphone 150. Microphone 150, through the use of interface adapter 122, provides the data to speech recognition unit 152. Speech recognition unit 152 parses the language spoken by the user to separate the words. Subsequently, speech recognition unit 152 recognizes that the user desires to execute a "switch to" command. Furthermore, given the context of the "switch to" command, speech recognition unit 152 knows that the program desired to be accessed is a "Time and Place" application. When speech recognition unit 152 determines that the program to be accessed is the "Time and Place" program, speech recognition unit 152 provides the appropriate control and data signals to CPU 110 to indicate both that the user desires to perform a change of focus operation via this "switch to" command and that the user desires to bring the "Time and Place" application to a first order of focus on display device 138. CPU 110 subsequently processes these commands to enable one of ROM 116 and RAM 114 to execute the desired application and display object 402 on display device 138.

Next, assume that a user desires to access the "Lotus Notes—Work Space at Office" application. As noted in the window list displayed on FIG. 4, the "Lotus Notes—Work Space at Office" application is currently running on data processing system 100. Therefore, when a user speaks a voice command "switch to Lotus Notes," speech recognition unit 152 parses the inputs received from user interface adapter 122 to note that the program to be accessed is "Lotus Notes." When speech recognition unit 152 compares this with the currently running applications listed by the window list, it notes that a "Lotus Notes—Work Space at Office" application is running. Speech recognition unit 152 does not require that each term of the program title specified in the window list be stated by an external user. Rather, speech recognition unit 152 determines that the spoken term "Lotus Notes" corresponds to a first portion of the title provided in the window list and provide control signals indicating that a focus of data processing system 100 should be modified. CPU 110 subsequently provides the appropriate control and data information to a remaining portion of data processing system 100 to modify a focus of data processing system 100 to display the "Lotus Notes—Work Space at Office" application on display device 138.

Next, assume that an external user desires to view an operating system window. Assume in one embodiment of the present invention that the operating system is OS/2 available from IBM Corporation. Therefore, for a user to access a window within this operating system, they must speak the command "switch to OS/2 window." However, as illustrated in FIG. 7, there are two open and active OS/2 windows currently available in data processing system 100. Therefore, after a user's words are detected by speech recognition unit 152 and evaluated to identify whether the words correspond to current applications on data processing system 100, speech recognition unit 152 provides control and data information to CPU 110 to access a first OS/2 window.

CPU 110 then executes the steps described in FIGS. 3-A and 3-B to determine whether the program to be displayed should be the first program or a subsequent program, depending on a number of commands executed by the user which access an OS/2 window. In this example, assume that the "switch to OS/2 window" command executed by the user is a first command. Therefore, CPU 110 will provide control and data information to access a first OS/2 title from the window list and change a focus of the window corresponding to that first OS/2 title, such that the first window is displayed on display device 138.

Next, assume that the user did not want to access the first OS/2 window, but instead wanted to access the second OS/2 window. In this case, the user must simply restate the command "switch to OS/2 window." Speech recognition unit 152 again recognizes that the spoken command recognizes a program which is currently running and, therefore, displayed on the window list (of FIG. 4). Speech recognition unit subsequently provides the appropriate control information to CPU 110. CPU 110 recognizes that this is the second "switch to OS/2" command received thereby. Referring to FIG. 8, window 800 is brought to focus upon execution of the second "switch to OS/2 window" command.

By now it should be apparent that a data processing system and method for implementing a voice command interface which allows a user to communicate in a more natural and intuitive manner has been provided. There are many additional configurations for implementing the invention described above.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:

memory for storing a window list;

a first input means for receiving a first user input;

a central processing unit coupled to the first input means for receiving the first user input, the central processing unit accessing a first program having a characteristic and performing a first operation in response to the first user input, the central processing unit automatically modifying the window list to form a modified window list in response to the first operation, wherein the central processing unit modifies the window list in response to operating system control signals; and, a speech recognition unit coupled to the memory for accessing the modified window list, the speech recognition unit being capable of recognizing a voice command corresponding to a first item of the modified window list.

2. The data processing system of claim 1 wherein the first operation is one of an open operation and a close operation.

3. The data processing system of claim 2 wherein the central processing unit adds the first characteristic to the window list when the first operation is the open operation.

4. The data processing system of claim 2 wherein the central processing unit removes the first characteristic from the window list when the first operation is the close operation.

5. The data processing system of claim 1 wherein the first item corresponds to the first characteristic.

6. The data processing system of claim 1, further comprising:

a second user interface for receiving a second user input.

7. The data processing system of claim 6 wherein the second user input is the voice command.

8. The data processing system of claim 1 wherein the voice command states the first characteristic.

9. The data processing system of claim 1 wherein the first characteristic is a name of the first program.

10. The data processing system of claim 1 wherein the first characteristic is a portion of a name of the first program.

11. The data processing system of claim 1, further comprising:

a navigator coupled to the speech recognition unit for enabling the speech recognition unit to access the modified window list.

12. The data processing system of claim 11 wherein the speech recognition unit parses a plurality of speakable items from the modified window list.

13. The data processing system of claim 12 wherein the voice command is one of the plurality of speakable items from the modified window list.

14. A method for accessing a data processing, comprising the steps of:

storing a window list into a memory;

receiving a first user input at a first user interface;

accessing a first program in response to the first user input;

enabling a central processing unit to perform a first program in response to the first user input;

enabling a central processing unit to perform a first operation in response to the first user input;

enabling the central processing unit to automatically modify the window list to form a modified window list in response to the first operation wherein the central processing modifies the window list in response to operating system control signals;

parsing the modified window list to determine a first speakable object; and, enabling a speech recognition unit to recognize the first speakable object.

15. The method of claim 14, further comprising the steps of:

receiving a voice command at a second user interface; and enabling the speech recognition unit to determine when the voice command corresponds to the first speakable object.

16. The method of claim 15, further comprising the step of:

accessing the first program in response to the voice command.

17. The method of claim 15, further comprising the step of:

modifying a focus of the first program in response to the voice command.

18. The method of claim 15, further comprising the steps of:

opening the first program in response to the first user input; and adding a first characteristic corresponding to the first program to the window list to form the modified window list.

19. The method of claim 18, further comprising the steps of:

receiving a voice command at a second user interface;

enabling the speech recognition unit to determine when the voice command corresponds to the first characteristic; and accessing the first program when the voice command corresponds to the first characteristic.

20. The method of claim 15, further comprising the steps of:

closing the first program in response to the first user input; and removing a first characteristic corresponding to the first program to the window list to form the modified window list.

21. The method of claim 20, farther comprising the steps of:

receiving a voice command at a second user interface; and disabling the speech recognition unit from determining when the voice command corresponds to the first characteristic.

22. A program storage device readable by a machine, tangibly embodying a program of instructions executable by the machine to perform method steps for accessing a data processing system, said method steps comprising:

receiving a first user input at a first user interface;

accessing a first program in response to the first user input;

enabling a central processing unit to perform a first operation in response to the first user input;

enabling the central processing unit to selectively modify the window list to form a modified window list in response to the first operation wherein the central processing unit modifies the window list in response to operating system control signal;

parsing the modified window list to determine a first speakable object; and, enabling a speech recognition unit to recognize the first speakable object.

23. The program storage device of claim 22, further comprising the method steps of:

receiving a voice command at a second user interface; and enabling the speech recognition unit to determine when the voice command corresponds to the first speakable object.

24. The program storage device of claim 23, further comprising the method step of:

accessing the first program in response to the voice command.

25. The program storage device of claim 23, further comprising the method step of:

modifying a focus of the first program in response to the voice command.

26. The program storage device of claim 23, further comprising the method steps of:

opening the first program in response to the first user input; and adding a first characteristic corresponding to the first program to the window list to form the modified window list.

27. The program storage device of claim 26, further comprising the method steps of:

receiving a voice command at a second user interface;

enabling the speech recognition unit to determine when the voice command corresponds to the first characteristic; and accessing the first program when the voice command corresponds to the first characteristic.

28. The program storage device of claim 23, further comprising the method steps of:

closing the first program in response to the first user input; and removing a first characteristic corresponding to the first program to the window list to form the modified window list.

29. The program storage device of claim 28, further comprising the method steps of:

receiving a voice command at a second user interface; and disabling the speech recognition unit from determining when the voice command corresponds to the first characteristic.

* * * * *

UNITED STATES PATENT AND TRADEMARK OFFICE
CERTIFICATE OF CORRECTION

PATENT NO. : 5,893,063
DATED : April 6, 1999
INVENTOR(S) : Loats et al

It is certified that error appears in the above-identified patent and that said Letters Patent is hereby corrected as shown below:

Column 11, Line 12 after "program having a" insert first ;
Column 12, Line 3 after "the first operation" insert ,;
Column 12, Line 61 after "processing unit to" delete [selectively] and insert automatically;
Column 12, Line 63 after "the first operation" insert ,; and
Column 12, Line 65, replace "signal" with signals.

Signed and Sealed this

Twenty-eighth Day of November, 2000

Attest:

Q. TODD DICKINSON

Attesting Officer

Director of Patents and Trademarks